(12) United States Patent
Jiang et al.

(10) Patent No.: US 12,153,640 B2
(45) Date of Patent: Nov. 26, 2024

(54) MACHINE-LEARNING BASED DOCUMENT RECOMMENDATION FOR ONLINE REAL-TIME COMMUNICATION SYSTEM

(71) Applicant: Salesforce, Inc., San Francisco, CA (US)

(72) Inventors: Feifei Jiang, San Mateo, CA (US); Zachary Alexander, Berkeley, CA (US); Yuanxin Wang, Mountain View, CA (US); Yixin Mao, San Mateo, CA (US); Sitaram Asur, Newark, CA (US); Regunathan Radhakrishnan, Dublin, CA (US); Aron Kale, Huntington Beach, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/079,857

(22) Filed: Dec. 12, 2022

(65) Prior Publication Data
US 2024/0193213 A1   Jun. 13, 2024

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .................. G06F 16/9535; G06F 16/9538
See application file for complete search history.

(56) References Cited

U.S. PATENT DOCUMENTS

| | | | | |
|---|---|---|---|---|
| 8,280,891 B1* | 10/2012 | Urbach | ................... | G06F 16/35 707/758 |
| 9,672,827 B1* | 6/2017 | Jheeta | ................... | G06F 16/338 |
| 11,238,125 B1* | 2/2022 | Brody | ................... | G06F 16/958 |
| 11,862,151 B2* | 1/2024 | Acero | ....................... | G06F 3/16 |
| 12,033,618 B1* | 7/2024 | Wei | .......................... | G06N 3/08 |
| 2019/0005021 A1* | 1/2019 | Miller | ..................... | G06Q 10/04 |

(Continued)

OTHER PUBLICATIONS

Salesforce, "Case," Object Reference for the Salesforce Platform, Version 55.0, Aug. 17, 2022, pp. 819-830.

(Continued)

*Primary Examiner* — Angelica Ruiz
(74) *Attorney, Agent, or Firm* — Polygon IP, LLP

(57) ABSTRACT

A cloud platform establishes a communication session between an agent and a user. The communication session is over an electrical medium. The cloud platform generates an interface on a client device associated with the agent. A first portion of the interface is configured to exchange messages between the agent and the user for a conversation or otherwise transcribe a conversation between the agent and the user. The cloud platform obtains, at a first time, a set of utterances from a transcript of the conversation. The cloud platform accesses a database including a plurality of articles. The cloud platform generates relevance scores between the conversation and the plurality of articles. The cloud platform then selects a subset of articles having relevance scores above a threshold value or proportion. The identified articles are presented on a second portion of the interface.

18 Claims, 4 Drawing Sheets

(56) References Cited

U.S. PATENT DOCUMENTS

2020/0065857 A1\* 2/2020 Lagi .................. G06Q 30/0254
2021/0174016 A1\* 6/2021 Fox ........................ G06N 3/045

OTHER PUBLICATIONS

Salesforce, "CaseArticle," Object Reference for the Salesforce Platform, Version 55.0, Aug. 17, 2022, pp. 831-832.
Salesforce, "LiveChatTranscript," Object Reference for the Salesforce Platform, Version 55.0, Aug. 17, 2022, pp. 2244-2251.

\* cited by examiner

MACHINE-LEARNING BASED DOCUMENT RECOMMENDATION FOR ONLINE REAL-TIME COMMUNICATION SYSTEM

BACKGROUND

This disclosure generally relates to communication sessions for customer service, and more specifically to retrieving relevant articles for resolving customer issues in real-time.

An online system provides customer service software solutions to one or more entities that correspond to one or more tenants of the online system. Each entity may use the service software solutions to provide customer support and solve customer problems. One type of customer service software is a communication tool which a customer (e.g., end consumer of sports product) of an entity (e.g., sports product manufacturer) can use to communicate with an agent (e.g., employee of the entity) to resolve a particular issue. For example, the communication may be over phone, web, live chat, e-mail, or text. By providing such software, the online system can help companies streamline service team processes and significantly improve customer satisfaction and problem resolution.

Typically, the online system establishes a communication session between an agent and a user. The communication session may be over live chat, SMS, audio call, and the like. For example, when the communication session is over live chat, the agent may be provided with an interface that is configured to exchange messages between the agent and the user for a conversation on an issue. For example, the interface may be a chat window that the user and the agent can use to exchange messages during a conversation for resolving an issue. Often times, during the communication session, the agent searches through a knowledge base to identify relevant articles and find potential answers to the issue in the articles.

Figure 1:
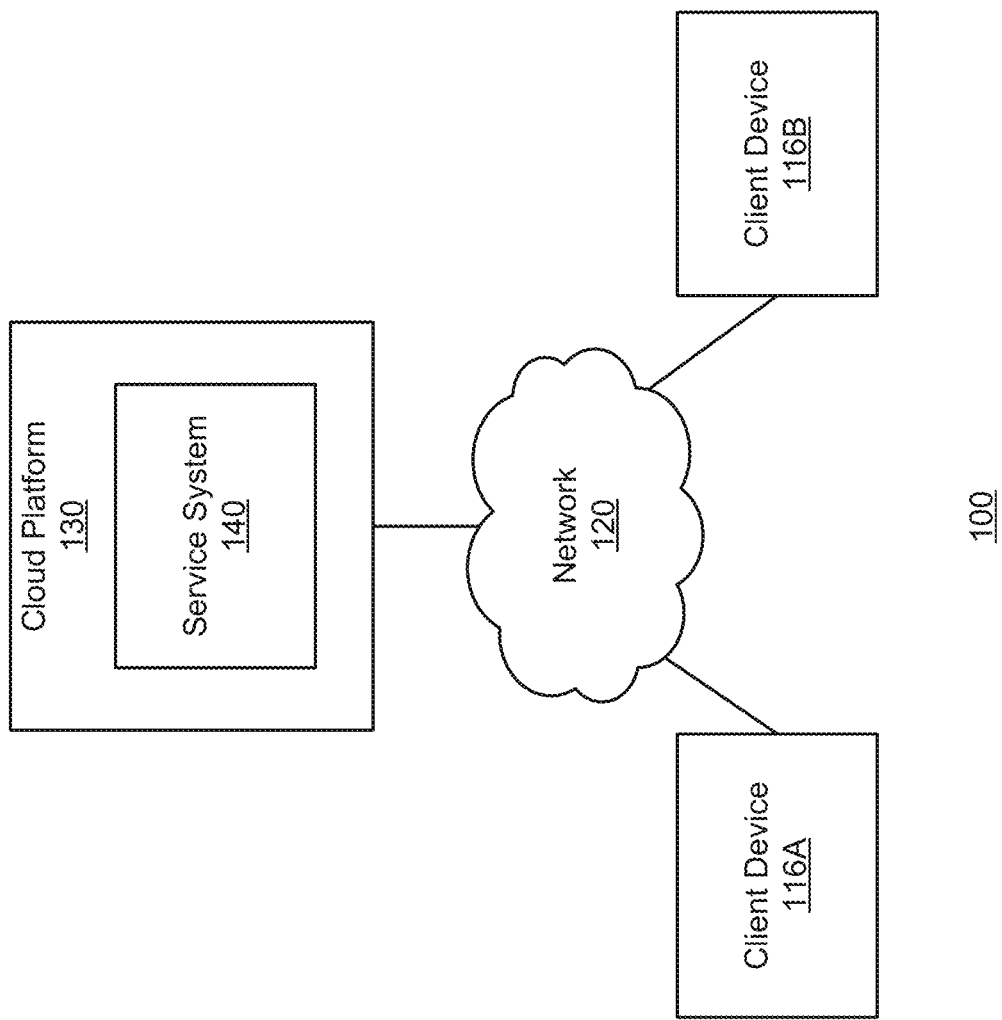
FIG. 1 is a block diagram of a system environment including a cloud platform and one or more client devices, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

A cloud platform establishes a communication session between an agent and a user. The communication session is over an electrical medium. The cloud platform generates an interface on a client device associated with the agent. A first portion of the interface is configured to exchange messages between the agent and the user for a conversation or otherwise transcribe a conversation between the agent and the user. The cloud platform obtains, at a first time, a set of utterances from a transcript of the conversation. An utterance includes a sequence of words from the agent to the user or from the user to the agent during the conversation. The cloud platform accesses a database including a plurality of articles. The cloud platform generates relevance scores between the conversation and the plurality of articles. A relevance score between a conversation and an article is generated by applying at least one relevance model to the set of utterances and the article. The cloud platform then selects a subset of articles having relevance scores above a threshold value or proportion. The identified articles are presented on a second portion of the interface.

System Environment

FIG. 1 is a block diagram of a system environment 100 including a cloud platform 130 and one or more client devices 116A, 116B, in accordance with an embodiment. The system environment 100 shown in FIG. 1 comprises a cloud platform 130, one or more client devices 116A, 116B, and a network 120. In alternative configurations, different and/or additional components may be included in the system environment 100.

The cloud platform 130 provide computing resources, such as storage, computing resources, applications, and the like to online systems 110 on an on-demand basis via the network 120 such as internet. The cloud platform 130 allows organizations, such as large-scale enterprises, to reduce upfront costs to set up computing infrastructure and also allows the organizations to deploy applications up and running faster with less maintenance overhead. The cloud platform 130 may also allow the organizations to adjust computing resources to rapidly fluctuating and unpredictable demands. The organizations can create data centers using instances of the cloud platform 130 for use by users of the organization.

The cloud platform 130 may deploy a significant number of services and/or applications for one or more entities using, for example, different products of the cloud platform 130. However, because of divisions such as business units, verticals, market dynamics, geographics, and the like, the services and applications may run across multiple instances and across multiple tenancies of the cloud platform 130. A tenant may correspond to an entity (e.g., business, university, non-profit organization). In one embodiment, the cloud platform 130 provides customer service software solutions to the one or more entities. An entity may use the service software solutions of the cloud platform 130 to provide support to users associated with the entity (e.g., customers of a company, students at a university).

One type of customer service software is a communication tool which a customer (e.g., end consumer of sports product) of an entity (e.g., sports product manufacturer) can use to communicate with an agent (e.g., employee of the entity) to resolve a particular issue. Specifically, the entity may have one or more agents, such as customer service agents, dedicated to resolve issues from customers or other types of users associated with the entity. The agents may use the communication tool to converse with a user on particular issues. For example, the communication may be over phone, web, live chat, e-mail, text, and the like. By providing such software, the cloud platform 130 can help entities, such as companies, streamline service team processes and significantly improve customer satisfaction and problem resolution.

Specifically, the customer service software establishes a communication session between an agent and a user. The communication session may be over electronic media, such as live chat, SMS, or audio call. For example, when the communication session is over live chat, the agent is provided with an interface configured to exchange messages between the agent and the user for a conversation on a particular issue. For example, the interface may be a chat window that the user and the agent can use to exchange messages for resolving the issue. Often times, the agent searches through a knowledge base during the communication session to identify relevant articles and find potential answers to the issue in the articles. The articles may be provided by the entity and may contain detailed information that may be helpful for resolving various issues that are brought up by the users associated with the entity. However, this may require significant time to search through the knowledge base and may delay the response time of the agent.

Thus, in one embodiment, the cloud platform 130 includes a service system 140 for establishing a communication session between an agent and a user. The communication session may be over an electrical medium. The service system 140 generates an interface on a client device 116 associated with the agent. In one instance, a first portion of the interface is configured to exchange messages between the agent and the user for a conversation or otherwise transcribe a conversation between the agent and the user. The service system 140 obtains, at a first time, a set of utterances from a transcript of the conversation, wherein an utterance includes a sequence of words from the agent to the user or from the user to the agent during the conversation.

The service system 140 accesses a database including a plurality of articles. The articles may be provided by the entity associated with the articles. The articles may be drafted by an administrator of the entity who is familiar with the procedures and policies of the entity, and the like. The service system 140 generates relevance scores between the conversation and the plurality of articles. A relevance score between the conversation and an article may be generated by applying at least one relevance model to the set of utterances and the article. The service system 140 selects a subset of articles having relevance scores above a threshold value or proportion, and presents the selected articles on a second portion of the interface. In this manner, the agent can quickly be presented with relevant articles that are helpful for resolving the issue in real-time while the agent is communicating with the user, reducing average call times and significantly improving customer satisfaction and problem resolution.

In one embodiment, the relevance scores between a transcript of a conversation and an article is a combination of a first relevance score, a second relevance score, and a third relevance score. The first relevance score may be determined by a query retrieval function (e.g., BM25 model) that estimates the relevance of the article to the utterances of the transcript. The second relevance score may be determined by encoding the utterances of the transcript to a conversation embedding using a machine-learned model (e.g., BERT transformer) and encoding the article to an article embedding using the same machine-learned model or another machine-learned model. The second relevance score is determined by taking the dot product between the conversation embedding and the article embedding. The third relevance score may be determined based on behavioral signals of articles, such as article popularity. Thus, the first relevance score, the second relevance score, and the third relevance score may be combined to produce a final score of an article for a conversation transcript.

Figure 2:
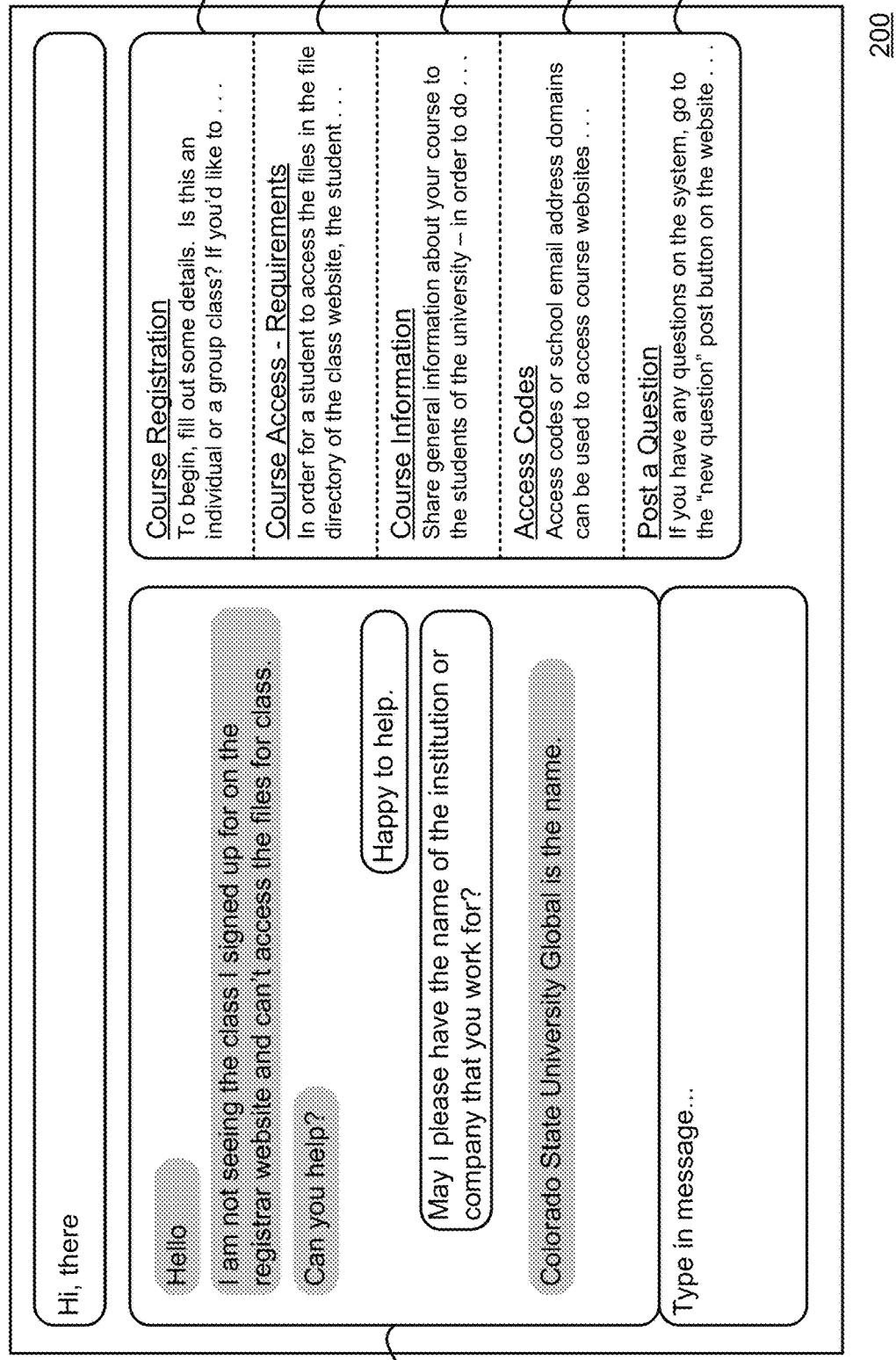
FIG. 2 illustrates an example interface including a chat window for communication between an agent and a user and a pane for presenting relevant articles to the agent of the chat, in accordance with an embodiment.

FIG. 2 illustrates an example interface including a chat window for communication between an agent and a user and a pane for presenting relevant articles to the agent of the chat, in accordance with an embodiment. Specifically, the example interface 200 generated by the service system 140 includes a first portion corresponding to a chat window 210 and a second portion corresponding to a pane for presenting relevant articles to the agent of the chat. Specifically, at a particular time in the conversation, FIG. 2 illustrates a chat where a user of a course registration website cannot access the files for a class the user had signed up for and is asking for help to an agent to resolve the issue.

The service system 140 obtains a set of utterances from the transcript of the chat. Specifically, the first utterance is "Hello" (speaker: Customer), the next utterance is "I am not seeing the class I signed up for on the registrar website and can't access the files for class." (speaker: Customer), the next utterance is "Can you help?" (speaker: Customer), the next utterance is "Happy to help." (speaker: Agent), the next utterance is "May I please have the name of the institution or company that you work for?" (speaker: Agent), the next utterance is "Colorado State University Global is the name." (speaker: Customer).

The service system 140, based on the extracted utterances, accesses a plurality of articles in a knowledge database. The knowledge database may include articles on resolving issues with the course registration website. For an article in the database, the service system 140 generates a relevance score indicating the relevance of the article to the transcript of the chat. In one instance, the relevance score is a combination of the first relevance score, the second relevance score, and the third relevance score of the article. The service system 140 selects a subset of the articles that have relevance scores above a threshold value or proportion.

The service system 140 presents the selected articles on a right pane of the interface, such that the agent communicating with the customer can access relevant articles in real-time. In the example shown in FIG. 2, the selected subset of articles includes article 220A on "Course Registration," article 220B on "Couse Access—Requirements," article 220C on "Course information," article 220D on "Access Codes," and article 220E on "Post a Question." For example, these articles might have been selected because they have the highest relevance scores for the conversation. Moreover, as an example, while article 220B may be the most relevant for resolving the customer's issue, the relevance score for article 220B may not be the highest since the conversation between the agent and the customer has just begun. The relevance score for article 220B may become the highest as the conversation proceeds and the relevance scores are updated for the articles to incorporate the additional context in the transcript.

Returning to the system environment 100 of FIG. 1, The client devices 116 are computing devices that display information to users and communicates user actions to the cloud platform 130. While two client devices 116A, 116B are illustrated in FIG. 1, in practice many client devices 116 may communicate with the cloud platform 130 in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the cloud platform 130. For example, a client device 116 executes a browser application to enable interaction between the client device 116 and the cloud platform 130 via the network 120. In another embodiment, the client device 116 interacts with the cloud platform 130 through an application programming interface (API) running on a native operating system of the client device 116, such as IOS® or ANDROID™.

In one embodiment, a user of the client device 116 may execute an application, such as a browser application or a local application, that allows the user to access the communication tool provided by the service system 140. For example, a user of client device 116A may be a user associated with an entity (e.g., business, university) and a user of client device 116B may be an agent of the entity that is, for example, hired by the entity to resolve customer issues. The user and the agent may communicate via a communication session established by the service system 140, for example, live chat, SMS, audio calls, or video calls. In one instance, an interface generated on the client device 116 of the agent may include a pane for displaying relevant articles for resolving an issue, such that the agent can quickly access relevant articles without having to manually search and identify relevant articles for the customer.

The network 120 provides a communication infrastructure between the cloud platform 130 (as well as the service system 140) and the client devices 116. The network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

Service System

Figure 3:
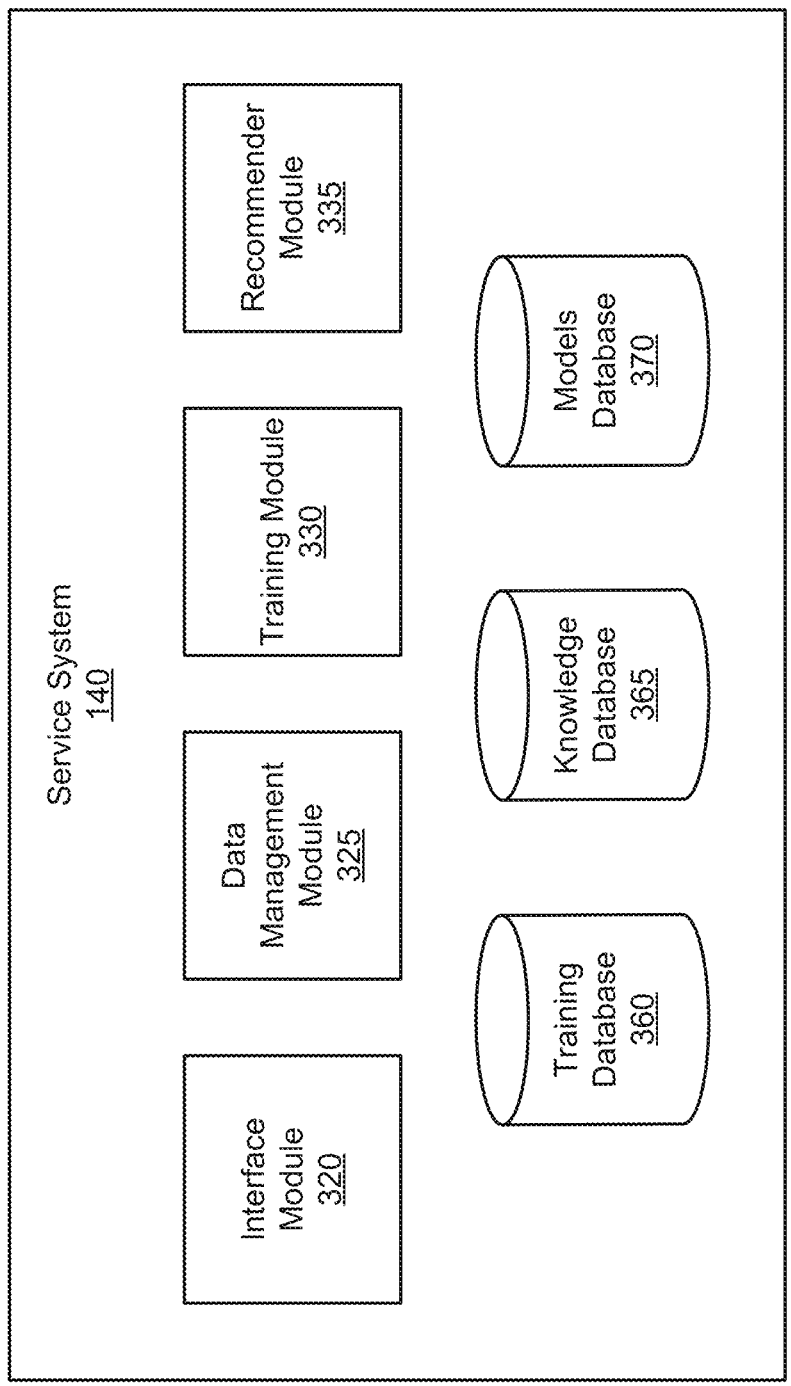
FIG. 3 is a block diagram of an architecture of a service system in the cloud platform, in accordance with an embodiment.

FIG. 3 is a block diagram of an architecture of a service system 140 in the cloud platform 130, in accordance with an embodiment. The service system 140 comprises modules including an interface module 320, a data management module 325, a training module 330, and a recommender module 335. The matching system 140 includes a training database 360 and a models database 365. Some embodiments can have different modules than those described here. Similarly, the functions described among the modules can be distributed in a different manner than is described here.

The interface module 320 receives requests to establish communication sessions between users and agents of the entity. Typically, the request is received from a user associated with an entity and is prompted by an issue the user is trying to resolve. Responsive to receiving a request, the interface module 320 may identify agents available for communication, and establish a communication session between the agent and the user. In other instances, the agent may initiate the request because, for example, the agent is trying to reach a customer about an unresolved issue (e.g., follow-up call from an earlier session).

In one embodiment, the communication session is established over an electronic medium, and may be via audio or video call, live chat, SMS text, and the like. In one instance, the communication session is live chat, and the interface module 320 may generate a user interface (UI) on the client devices 116 that includes a chat interface for exchanging messages. In particular, the interface module 320 may generate a UI on the client device 116 for the agent that includes a first portion corresponding to the chat interface and a second portion that corresponds to a component for presenting relevant articles for the conversation between the agent and the user. The chat interface and the component for presenting articles may be part of the same window or may be presented adjacent to each other, such that the agent can retrieve the contents of the relevant articles (e.g., by clicking on the link of the article) while the agent is communicating with the user through the chat interface.

Moreover, while the example shown in FIG. 2 illustrates an interface having a pane (including articles 220A through 220E) on the right side of the chat interface 210, it is appreciated that the component for presenting relevant articles can be in any appropriate manner. For example, the articles may be presented on a pane at a left side, an upper side, or a lower side of the chat interface. In another embodiment, the component may be a separate window that is overlaid on the chat interface responsive to receiving an indication from the agent.

The interface module 320 may receive a request to display a subset of relevant articles and display the subset of articles via the component of the UI. The agent may access the content of the article by selecting a hyperlink that guides the agent to the article. Depending on the configurations of the service system 140, the interface module 320 may receive a request to update the subset of relevant articles every predetermined interval (e.g., every two minutes, every minute, every 30 seconds) or only when a request is made. For example, the subset of articles may be updated as the conversation between the user and the agent progresses and more context on the issue becomes available, leading to more relevant articles. In one embodiment, the interface module 320 may send a request to the recommender module 335 to update the subset of relevant articles at each turn of the conversation between the user and the agent. For example, the subset of articles may be updated every time the agent or the user submits a new message in the chat.

The data management module 325 generates and manages data for training the one or more relevance models or for characterizing the articles in the knowledge database. In one embodiment, the data management module 325 obtains historical data from previous instances of conversations between agents and users. In particular, the data management module 325 may obtain the transcripts of the previous conversations between an agent and a user, and parse the transcript into a set of utterances. The data management module 325 can also tokenize the utterances of the transcript into one or more tokens. Each token is a mathematical representation of a word, a part of a word, a phrase, an utterance, and the like.

One data source includes instances where one or more articles are "attached" to a case that indicates the articles were used to resolve the customer issue for the user. In particular, a customer issue may be assigned as a case and may be associated with a case identifier that uniquely identifies the case. When the agent indicates the issue has been resolved, the agent can attach one or more articles that the agent had used to resolve the issue.

Another data source includes search logs. Search logs capture clicks and associated search queries on the articles of the knowledge database that the agent had made during a conversation. In one instance, the search logs capture historical search queries for a knowledge article that the agents had made before clicking on the article. The data management module 325 may obtain the most popular search queries that led to the article for each article in the knowledge database. In another instance, the search logs capture "implicit attaches." Many agents may not explicitly attach the articles that were used to resolve a specific case because, for example, it is cumbersome and time-consuming. Often times, the agent can submit a search query and access the articles retrieved based on the search query. An agent may then click or hover over the retrieved articles. The articles that the agent interacted with (e.g., hovered over or clicked) may be considered implicit attaches, as the agent did not explicitly attach the articles to the case themselves, but are nevertheless deemed to be relevant to resolving the issue as the agent had interacted with the articles during the communication session.

The training database 360 includes a plurality of training instances for training a machine-learned relevance model. A training instance may include one or more series of tokens, where a series of tokens corresponds to an utterance in the transcript of the conversation for a case. For example, a series of tokens may correspond to an utterance made by the user, and each token may represent a word in the utterance. The training instance also includes one or more articles that were attached or were not attached to the case. The training instance also includes an attachment label indicating whether each of the articles are relevant or not relevant for resolving the case. In one instance, the attachment label is 1 if an article is determined to be relevant to the case and 0 if not.

In one instance, the training database 360 also includes training instances based on implicit attaches obtained from the search log. In such an instance, the training instance may include one or more series of tokens obtained from the transcript of the conversation for a case. The training instance may also include one or more articles that were implicitly attached (e.g., the agent hovered over or clicked on an article) or not attached to the case, as well as an attachment label indicating whether each of the articles are relevant or not relevant for resolving the case. In this manner, even if agents have not explicitly attached an article to a case, the service system 140 can augment the training data using implicit attaches that still provide a relatively accurate measure of whether an article is relevant for resolving the case.

The knowledge database 365 is a database of articles or other content items that may be useful for resolving user issues. Specifically, the knowledge database 365 may include documents of information, and can be stored on a per-tenant basis. For example, the knowledge database 365 may store knowledge articles for a tenant that is a business organization selling external memory drives. The articles in the knowledge database 365 can include information on various processes of interest to users, like how to reset the product to its default settings, how much storage the product supports, other frequently asked questions (FAQ's), and the like. The documents may have been written by expert customer agents that have extensive background knowledge on the issue or other experts associated with the entity. The documents can be in the form of webpages (e.g., HTML pages) or word processing application documents.

In one embodiment, an article stored in the knowledge database 365 is associated with metadata that describe one or more characteristics of the article. In one instance, the metadata for an article includes a title, a summary, and a search query text that indicates the popular search queries that led to clicks on the article. Specifically, the search query text may be obtained from the historical search logs as described above. In one instance, the data management module 325 generates the search query text by identifying the K-most frequent search queries that led to clicks on an article, and repeating each identified search query by log(N) times (N being the number of clicks), and concatenating the search queries into a string. In this manner, the search query text assigns higher weights to more popular search queries.

In one embodiment, an article may be assigned to data categories that are classifications of articles. For example, a data category may categorize articles with respect to product types (e.g., mortgage, personal loan, auto loan), topics (e.g., mobile, web, big data, personal finance), geographical areas (e.g., different insurance policies for each state), or customer types (e.g., home, small and medium businesses, large enterprise). Moreover, articles can be tagged with multiple data categories or even no data categories. In one instance, an administrator of the entity responsible for managing the articles may assign different data categories to an article.

The training module 330 trains one or more machine-learned relevance models that are configured to generate a conversation embedding from utterances of a conversation transcript and an article embedding from an article. In one embodiment, parameters of the relevance model are trained such that the dot product of the article embedding and the conversation embedding denotes a degree of relevance between the article and the conversation. In one embodiment, the machine-learned relevance model includes a first portion configured to generate the conversation embedding and a second portion configured to generate the article embedding. The first portion is coupled to receive a series of tokens for an utterance and generate an utterance embedding and an attention score for the utterance. The combination of the individual utterance embeddings weight by the attention scores of each respective utterance is the conversation embedding. The second portion is coupled to receive a series of tokens for an article and generate an article embedding for the article.

In one embodiment, an architecture of the machine-learned relevance model is configured as a transformer-based architecture, and may be in one implementation, a Bidirectional Encoder Representations from Transformers (BERT) model that encodes a series of tokens into a series of embeddings. In other embodiments, an architecture of the machine-learned relevance model can be configured as any other architecture that maps input data (e.g., text or images) into an embedding in latent space. For example, a machine-learned relevance model may be configured as recurrent neural networks (RNN), long short-term memory networks (LSTM), or any combination thereof.

In one embodiment the training module 330 obtains a set of training instances from, for example, the training database 360 generated by the data management module 325. The training module 330 trains the relevance model by iterating between a forward pass step and a backpropagation step to reduce a loss function. During the forward pass step, the training module 330 obtains the one or more series of tokens that each correspond to a respective utterance in the conversation of a given training instance. The training module 330 generates one or more utterance embeddings and attention scores for the utterance embeddings by applying parameters of the first portion of the relevance model to the series of tokens for each utterance. The individual utterance embeddings are weighted by their respective attention scores to generate the conversation embedding for the training instance.

The training module 330 also generates an article embedding by applying parameters of the second portion of the relevance model to the series of tokens for an article. In one embodiment, the series of tokens for an article may correspond to the content of the article. For example, the series of tokens for an article may each represent a respective word, part of a word, punctuation, and the like of an article. In another embodiment, the series of tokens for an article may correspond to the content of the article but also include the metadata for the article described with respect to the knowledge database 365. The training module 330 combines the article embedding and the conversation embedding through a dot product to determine an estimated relevance between the conversation and the article. This process is repeated for other training instances in a given batch for the iteration.

The training module 330 determines a loss function that indicates a difference between the labels and the estimated relevance generated for the training instances of a batch. In one instance, the loss function is given by a cross-entropy loss:

$$\text{cross-entropy loss} = \sum_{i=1}^{n} -w_{y_i} \log \frac{\exp(p_{(i, y_i)})}{\sum_{c=1}^{C} \exp(p_{(i, c)})}$$

where n is the total number of training instances in a batch, $y_i$ is the label for training instance i, $p_{(i,yi)}$ is the estimated relevance output by the relevance model for the positive category (i.e., article and transcript are relevant), $p_{(i,c)}$ is the estimated relevance output by the relevance model for category c, and $w_{yi}$ is the weight for sample i in the loss function. In another instance, the loss function is given by:

$$\text{cross-entropy loss} = \sum_{i=1}^{n} y_i \log(p_i) + (1 - y_i) \log(1 - p_i)$$

where n is the total number of training instances in a batch, $y_i$ is the label for training instance i, and $p_i$ is the estimated relevance for the training instance output by the relevance model. However, it is appreciated that in other embodiments, the loss function can assume other forms, such as hinge loss, and the like.

During the backpropagation step, the training module 330 updates parameters of the relevance model by backpropagating error terms from the loss function. For example, parameters of the first portion and the second portion of the relevance model may be updated based on error terms that are one or more derivatives of the loss function. The forward pass step and the backpropagation step may be repeated for multiple batches of training data until a convergence criterion for the parameters is reached (e.g., change between iterations is less than a predetermined threshold). The trained relevance model is stored in the model database 370. In this manner, the trained relevance model can learn which utterances to pay attention to for a given conversation transcript and which utterances are most informative.

The recommender module 335 obtains the transcript of a conversation and generates one or more recommended articles in the knowledge database that are identified as relevant to the conversation. In one embodiment, the recommender module 335 accesses a plurality of articles in the knowledge database 365. For an article, the recommender module 335 obtains one or more relevance scores for a conversation transcript and the article, and combines the relevance scores into a final score.

In one instance, the recommender module 335 obtains a first relevance score that is determined by a first relevance model that is a query retrieval function. In one implementation, the query retrieval function is a BM25 model. In one embodiment, the query retrieval function is given by:

$$\text{relevance score}(D, Q) = \sum_{i=1}^{n} IDF(q_i) \cdot \frac{f(q_i, D) \cdot (k_1 + 1)}{f(q_i, D) + k_1 \cdot \left(1 - b + b \cdot \frac{|D|}{\text{avgdl}}\right)}$$

where D corresponds to a tokenized representation of the contents and metadata (e.g., title, summary, and search query text) of a particular article, Q represents the tokenized representation of a conversation transcript at a point in time, $IDF(q_i)$ is the inverse document frequency function of a term $q_i$ in Q, $f(q_i,D)$ is the term $q_i$'s frequency in article D, $|D|$ is the length of the article in words or tokens, and avgdl is the average article length in the collection of articles from which D is drawn. Moreover, $k_1$ and b are free parameters that can be chosen appropriately according to the collection of articles. However, the BM25 retrieval function is only one example function from which a first relevance score can be determined, and it is appreciated that in other embodiments, the recommender module 335 can use any appropriate query retrieval function for determining relevance.

The recommender module 335 may also obtain a second relevance score by applying a second relevance model that is a machine-learned relevance model described with respect to the training module 330. Specifically, the recommender module 335 may apply a first portion of the relevance model to individual utterances of the transcript to generate utterance embeddings and respective attention scores. The recommender module 335 may combine the utterance embeddings weighted by the attention scores to generate the conversation embedding for the transcript. The recommender module 335 applies the second portion of the relevance model to the content or metadata of the article to generate an article embedding. The recommender module 335 combines the article embedding and the conversation embedding to generate the second relevance score.

The recommender module 335 may also obtain a third relevance score that models behavioral signals of an article that is a third relevance model. In one instance, the behavior signals are popularity of articles indicated by, for example, number of clicks to view the article, number of hovering over the article, number of search queries that resulted in retrieval of the article, and the like. The third relevance score may indicate an absolute or relative measure of popularity of the article.

The recommender module 335 combines the first relevance score, the second relevance score, and the third relevance score to produce a final score of each article in the knowledge database for the tenant. In one embodiment, the final score is given by:

final score=$R_1(x)+R_2(x)+R_3(x)$ where $R_1(x)$ is a ranking function applied to the first relevance score x, $R_2(x)$ is a ranking function applied to the second relevance score x, and $R_3(x)$ is a ranking function applied to the third relevance score x. In one instance, for each relevance score, the ranking function is given by:

$$R(x) = \frac{1}{a + \left(b - b \cdot CDF_{N(0,1)}\left(\frac{x - x_{mean}}{x_{std}}\right)\right)}$$

where x denotes the relevance score, CDF is the cumulative distribution function, N(0, 1) is a Gaussian distribution with mean 0 and variance of 1, $x_{mean}$ is the mean of the relevance scores of the collection of articles evaluated by the recommender module 335, and $x_{std}$ is the standard deviation of the relevance scores of the collection of articles. Thus, the final score represents a rank of the article with respect to the degree of relevance.

The recommender module 335 selects a subset of relevant articles that have a final relevance score above a threshold value or proportion and provides the selected subset of articles to the interface module 325 for presentation to the agent. Put in a different way, the recommender module 335 selects a subset of articles that have a final relevance score above a threshold value or proportion. The final relevance score may be monotonously increase with the first, second, and/or third relevance scores. In another embodiment, the recommender module 335 may also select the subset of articles by combining the relevance scores into a final relevance score (e.g., by combining the first, second, third relevance scores for an article) and sorting the articles with respect to the final relevance score. However, using the ranking function described above provides a quicker way to rank articles, which can be an additional technological benefit to present the relevant articles quicker when the agent is communicating with a user in real-time.

In one embodiment, a case for a conversation is assigned to a data category. The types of data categories assigned to a case may be same or different as the data categories assigned to the articles of the knowledge database. For example, a user starting a communication session with an agent may populate pre-chat fields created by the agent before the session starts or the entity may provide a form that the user fills out before the session can be established with an agent. The form may have a list of data categories and the user can check which data categories the issue should be tagged with. As an example, a user with an inquiry on insurance policies in California may indicate that the issue should be tagged with data category of "California insurance policies."

In such an instance, the recommender module 335 may first filter out a set of articles that are associated with the data categories assigned to the conversation, and compute the relevance scores for only those articles in the filtered set. For example, the filtered set of articles may be tagged with the same data category as the conversation, or may be tagged with data categories that are otherwise relevant to the data category of the conversation. For example, the recommender module 335 may filter out a set of articles tagged with "California insurance policies" for the particular entity, compute the relevance scores for the articles in the filtered set, and present the articles that have a final relevance score above a threshold value or proportion. As another example, when a data category of the conversation is "personal finance," the recommender module 335 may filter out a set of articles tagged with "mortgage," "auto loans," "personal loans," or other types of personal finance related products, and identify the subset of relevant articles from this filtered set.

In one embodiment, the recommender module 335 may repeat the recommendation process described above every predetermined interval, for example, every 30 seconds, every two minutes, and the like, to generate an updated subset of articles. In another embodiment, the recommender module 335 may repeat the recommendation process at every turn of a conversation between the agent and the user. For example, the recommender module 335 may update the subset of relevant articles every time the user or the agent submits new messages in the chat. The relevance estimates are likely to improve over time as the conversation between the user and the agent proceeds, and more context on the issue is included in the transcript. Thus, the recommender module 335 may obtain an updated transcript of the conversation, parse the utterances in the updated transcript, and identify an updated subset of relevant articles based on the updated transcript, so that the subset of relevant articles presented to the agent are refreshed every interval. In one instance, the recommender module 335 may use only a recent portion of the transcript (e.g., a sliding window of recent utterances) or may use the entire transcript up to the most recent utterance to generate the updated subset of relevant articles.

In another embodiment, the recommender module 335 may apply a thresholding process in which the subset of relevant articles presented to the agent are updated only when the final relevance scores of the articles with respect to a transcript at a given point in time are above a threshold value or proportion (e.g., final relevance scores of identified articles are above a score of 9). Specifically, the recommender module 335 may continuously obtain updated transcripts of the conversation, compute relevance scores for the articles with respect to the updated transcripts, and identify a subset of articles for presentation only when there is a subset of articles that have a final relevance score above a certain threshold. Thus, the agent is presented with an updated set of relevant articles only when the articles have a relevance score that is sufficiently high or in other words, are identified to be highly relevant to the conversation transcript. Since the agent can easily get distracted if articles are constantly updated during communication with a user, the recommender module 335 can selectively determine to present an updated subset of relevant articles only when the relevance scores for a subset of articles are relatively high and there is high confidence that the articles will be actually relevant to the conversation.

Method of Recommending Relevant Articles on an Interface

Figure 4:
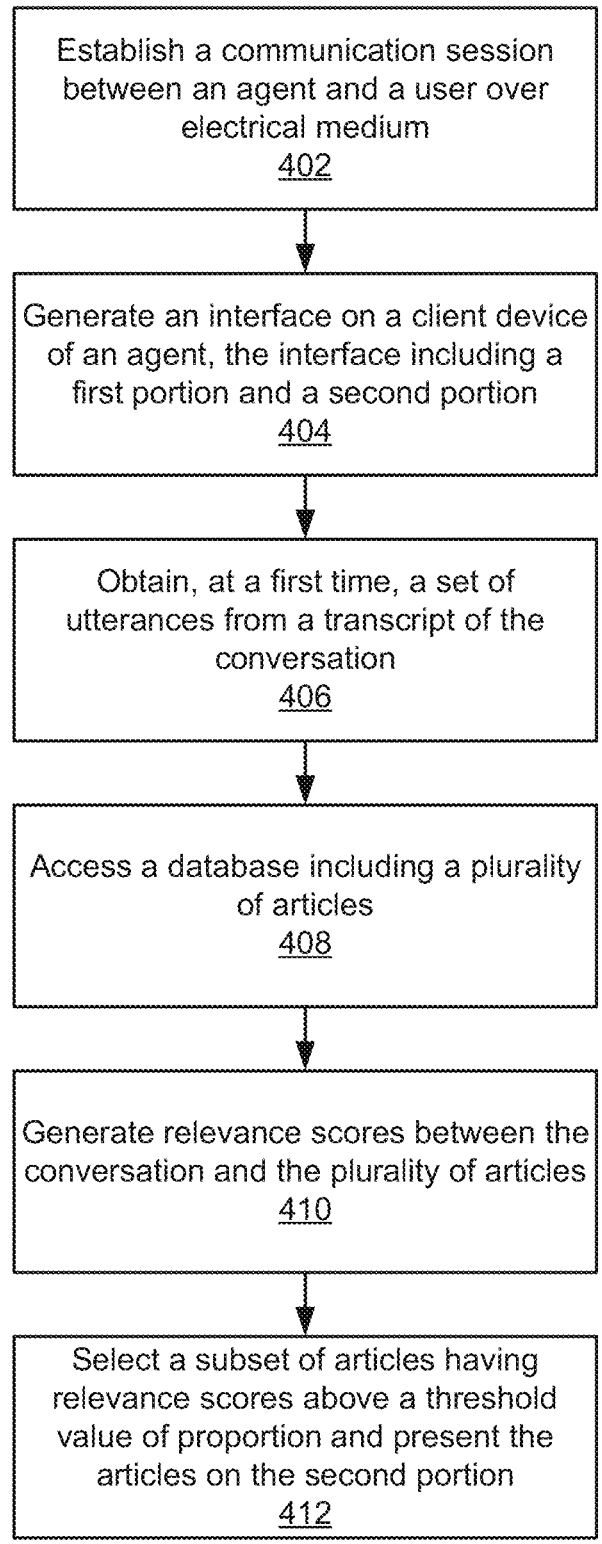
FIG. 4 is a flowchart illustrating a method of recommending relevant articles to a conversation between the agent and the user, in accordance with an embodiment.

FIG. 4 is a flowchart illustrating a method of recommending relevant articles on an interface, in accordance with an embodiment. In one embodiment, the process of FIG. 4 is performed by various modules of the cloud platform 130, specifically the service system 140. Other entities may perform some or all of the steps of the process in other embodiments. Likewise, embodiments may include different and/or additional steps, or perform the steps in different orders.

The service system 140 establishes 402 a communication session between an agent and a user. The communication session may be over electrical media. The service system 140 generates 404 generating an interface on a client device associated with the agent. A first portion of the interface may be configured to exchange messages between the agent and the user for a conversation or otherwise transcribe a conversation between the agent and the user. The service system 140 obtains 406, at a first time, a set of utterances from a transcript of the conversation. An utterance may include a sequence of words from the agent to the user or from the user to the agent during the conversation. The service system 140 accesses 408 a database including a plurality of knowledge articles. The service system 140 generates 410 relevance scores between the conversation and the plurality of articles. A relevance score between the conversation and an article is generated by applying at least one relevance model to the set of utterances and the article. The service system 140 selects 412 a subset of articles having relevance scores above a threshold value or proportion. The service system 140 presents the selected subset of articles on a second portion of the interface.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    establishing a communication session between a human agent and a user, wherein the communication session is over an electrical medium and relates to a tenant of a plurality of tenants accessing computing services via a cloud platform;
    transmitting one or more instructions to generate an interface on a client device associated with the human agent, wherein a first portion of the interface is configured to display an exchange of one or more messages between the human agent and the user for a conversation between the human agent and the user;
    obtaining, at a first time, a set of utterances from a transcript of the conversation, wherein an utterance includes a sequence of words from the human agent to the user or from the user to the human agent during the conversation;
    accessing a database to identify a plurality of articles specific to the tenant;
    generating relevance scores between the conversation and the plurality of articles, wherein a relevance score between the conversation and an article is generated by (1) applying a query retrieval function that estimates a relevance of the article to the transcript and (2) determining an encoding of the transcript to a conversation embedding via a bi-directional encoder representation from transformer model;
    selecting a subset of articles having relevance scores above a threshold value; and
    presenting the selected subset of articles on a second portion of the interface.

2. The method of claim 1, wherein the communication session is at least one of a chat session, SMS text, audio call, or video call.

3. The method of claim 2, wherein the communication session is a chat session and the first portion of the interface is a chat interface displaying the exchange of messages between the agent and the user for the chat session.

4. The method of claim 1, wherein generating the relevance score for the article comprises:
    obtaining a second relevance score by:
        applying at least a first portion of a machine-learned transformer model to the utterances of the conversation to generate a conversation embedding for the conversation,
        applying a second portion of the machine-learned transformer model to at least contents of the article to generate an article embedding, and
        combining the conversation embedding and the article embedding to generate the second relevance score.

5. The method of claim 1, wherein generating the relevance score for the article comprises:
obtaining a third relevance score that indicates a popularity of the article with respect to a number of clicks to view the article.

6. The method of claim 1, wherein selecting the subset of articles further comprises:
applying a ranking function to the relevance scores for the articles, where the ranking function is proportional to:

$$\frac{1}{a + \left(b - b \cdot CDF_{N(0,1)}\left(\frac{x - x_{mean}}{x_{std}}\right)\right)}$$

where a, b are constants, x is a relevance score for a respective article, $X_{mean}$ is an average of the relevance scores for a collection of articles, $CDF_{N(0,1)}$ is the cumulative distribution function based on a normal Gaussian distribution, and $x_{std}$ is a standard deviation of the relevance scores for the collection of articles.

7. The method of claim 1, wherein the second portion of the interface is a pane on a left-side, right-side, lower-side, or an upper-side of the first portion of the interface.

8. The method of claim 1, further comprising:
obtaining, at a second time, an updated set of utterances from the transcript of the conversation;
updating relevance scores between the updated transcript and the plurality of articles; and
responsive to determining that an updated subset of articles have updated relevance scores above a threshold value or proportion, presenting the selected subset of articles on the second portion of the interface,
responsive to determining that no subset of articles have updated relevance scores above the threshold value or proportion, withholding presentation of an updated subset of articles for display on the second portion of the interface.

9. The method of claim 1,
wherein the conversation is assigned to a data category and one or more articles of the plurality of articles are assigned to a data category, and
wherein generating the relevance scores comprises generating the relevance scores for a filtered set of articles that have data categories related to the data category of the conversation.

10. A non-transitory computer-readable storage medium storing computer program instructions executable to perform operations, the operations comprising:
establishing a communication session between a human agent and a user, wherein the communication session is over an electrical medium and relates to a tenant of a plurality of tenants accessing computing services via a cloud platform;
transmitting one or more instructions causing to generate an interface on a client device associated with the human agent, wherein a first portion of the interface is configured to display an exchange of one or more messages between the human agent and the user for a conversation or otherwise transcribe a conversation between the human agent and the user;
obtaining, at a first time, a set of utterances from a transcript of the conversation, wherein an utterance includes a sequence of words from the human agent to the user or from the user to the human agent during the conversation;
accessing a database to identify including a plurality of articles specific to the tenant;
generating relevance scores between the conversation and the plurality of articles, wherein a relevance score between the conversation and an article is generated by (1) applying at least one relevance model to the set of utterances and the article a query retrieval function that estimates a relevance of the article to the transcript and (2) determining an encoding of the transcript to a conversation embedding via a bi-directional encoder representation from transformer model;
selecting a subset of articles having relevance scores above a threshold value; and
presenting the selected subset of articles on a second portion of the interface.

11. The non-transitory computer-readable storage medium of claim 10, wherein the communication session is at least one of a chat session, SMS text, audio call, or video call.

12. The non-transitory computer-readable storage medium of claim 11, wherein the communication session is a chat session and the first portion of the interface is a chat interface displaying the exchange of messages between the agent and the user for the chat session.

13. The non-transitory computer-readable storage medium of claim 10, wherein generating the relevance score for the article comprises:
obtaining a second relevance score by:
applying at least a first portion of a machine-learned transformer model to the utterances of the conversation to generate a conversation embedding for the conversation,
applying a second portion of the machine-learned transformer model to at least contents of the article to generate an article embedding, and
combining the conversation embedding and the article embedding to generate the second relevance score.

14. The non-transitory computer-readable storage medium of claim 10, wherein generating the relevance score for the article comprises:
obtaining a third relevance score that indicates a popularity of the article with respect to a number of clicks to view the article.

15. The non-transitory computer-readable storage medium of claim 10, wherein selecting the subset of articles further comprises:
applying a ranking function to the relevance scores for the articles, where the ranking function is proportional to:

$$\frac{1}{a + \left(b - b \cdot CDF_{N(0,1)}\left(\frac{x - x_{mean}}{x_{std}}\right)\right)}$$

where a, b are constants, x is a relevance score for a respective article, $X_{mean}$ is an average of the relevance scores for a collection of articles, and $x_{std}$ is a standard deviation of the relevance scores for the collection of articles.

16. The non-transitory computer-readable storage medium of claim 10, wherein the second portion of the interface is a pane on a left-side, right-side, lower-side, or an upper-side of the first portion of the interface.

17. The non-transitory computer-readable storage medium of claim 10, wherein the instructions further comprise:
- obtaining, at a second time, an updated set of utterances from the transcript of the conversation;
- updating relevance scores between the updated transcript and the plurality of articles; and
- responsive to determining that an updated subset of articles have updated relevance scores above a threshold value or proportion, presenting the selected subset of articles on the second portion of the interface,
- responsive to determining that no subset of articles have updated relevance scores above the threshold value or proportion, withholding presentation of an updated subset of articles for display on the second portion of the interface.

18. The non-transitory computer-readable storage medium of claim 10,
- wherein the conversation is assigned to a data category and one or more articles of the plurality of articles are assigned to a data category, and
- wherein generating the relevance scores comprises generating the relevance scores for a filtered set of articles that have data categories related to the data category of the conversation.

* * * * *